May 19, 1970 D. J. SULLIVAN 3,513,041

FABRICATION OF A GERMANIUM DIFFUSED BASE POWER TRANSISTOR

Original Filed June 19, 1967

INVENTOR

DANIEL J. SULLIVAN

Mueller, Aichele & Rauner

ATTORNEY

United States Patent Office 3,513,041

Patented May 19, 1970

3,513,041

FABRICATION OF A GERMANIUM DIFFUSED BASE POWER TRANSISTOR

Daniel J. Sullivan, Phoenix, Ariz., assignor to Motorola, Inc., Franklin Park, Ill., a corporation of Illinois Original application June 19, 1967, Ser. No. 647,008. Divided and this application Dec. 16, 1968, Ser. No. 803,506

Int. Cl. H01l 7/46

U.S. Cl. 148—178 7 Claims

ABSTRACT OF THE DISCLOSURE

A germanium PNP alloy-diffused base power transistor is made by a critical sequence of steps beginning with the formation of a gallium doped collector junction in a high resistivity N-type germanium die. The alloy-diffused base region and base contact layer are then formed by alloying an antimony-doped lead preform to the opposite surface of the germanium die. The alloy layer is formed at a peak temperature of about 830° C., followed by an extended post-alloy-diffusion period of about four hours at 825° C., thereby producing a deep diffusion gradient in the base region, needed for a high voltage, high frequency, power transistor. The entire lead-antimony preform is removed, followed by the formation of an alloyed indium-aluminum emitter region penetrating the antimony alloyed base contact layer to form an emitter-base junction at a depth slightly greater than the antimony-doped alloy region. The indium-aluminum emitter produces high current gains, and the resulting wide base-width enables the transistor to endure high voltage and high current operating conditions, without failing, due to the secondary breakdown effect. The base contact is made by fusing a lead-tin-antimony ring in contact with the alloyed layer of the base region.

This is a division of application, Ser. No. 647,008 filed June 19, 1967, now abandoned.

BACKGROUND

This invention relates to the fabrication of power transistors capable of reliable operation in high current, high voltage switching circuits and, more particularly, to the fabrication of germanium alloy-diffused base power transistors.

The transistors of the invention have been developed for applications requiring high reverse breakdown voltages, e.g., applications requiring a $BV_{CBO}$ greater than 150 volts. An example is found in the transistorized automobile ignition system wherein the device is operated on signals from low current breaker points to switch sharp heavy pulses of current into a primary winding of the ignition coil. The breaker points do not tend to pit and burn as is usually the case since the heavy current pulses pass through the transistor rather than through the breaker points. When such pulses rise or fall quickly to or from a peak value, a high voltage is available across a secondary winding which fires the spark plug. As the spark arcs the gap of the spark plug, a reverse voltage is induced in the primary coil, as may be measured across the terminals of the transistor. The reverse voltage induced in the primary winding is many times the ordinary operating voltage supplied to the primary by the battery and this energy will destroy a transistor having a low breakdown characteristic. Although it is desirable to use a transistor having a fast switching speed, this is not so important as having high reverse breakdown voltages and having an operating area which will safely allow high voltage and high current excursions without permitting secondary-breakdown to occur. Accordingly, the use of an increased base thickness in the transistor of the present invention reflects a willing sacrifice of some switching speed in favor of increased breakdown voltage and increased resistance to secondary-breakdown.

Other applications include high peak power switching circuits, particularly including high current, high voltage inverter and converter circuits, and motor control systems.

As an aid in obtaining reliable transistor operation during high current, high voltage operating conditions, the base-width of the transistor should be greater than 2.5 mils. To obtain good current gain at collector currents up to 25 amperes with a thick base-width, a PNP transistor has been found to require an aluminum-doped emitter in order to maintain high emitter efficiency. Also, the minority carrier lifetime must be maintained at a relatively high level throughout the base region. If the lifetime is low, the carriers injected from the emitter will combine in the base region and never reach the collector junction. Obviously, this would defeat a high current gain objective.

The slower frequency response characteristic of devices having a thick base region can be offset significantly by establishing a resistivity gradient in the base region in front of the emitter junction. Such a gradient will raise the "punch-through" voltage of the transistor. In addition, this gradient produces an electric field which aids the flow of carriers from the emitter to the collector. Therefore, the frequency response of the transistor and its switching characteristics are improved. To further optimize the switching times, a relatively thick, low resistivity layer may be formed between the emitter and the base contact. This is normally accomplished by using solid state diffusion techniques, which generally require at least 13 to 15 hours for satisfactory results. Thus, a clear need exists to provide alternate techniques, capable of saving valuable production time.

THE INVENTION

It is an object of the invention to provide an improved diffused base, power transistor possessing good current gain at collector currents as high as 25 amperes. Good gain at even higher currents is possible if the device is made geometrically larger. It is a further object of the invention to provide an improved germanium power transistor capable of reliable, safe operation in switching circuits which generate high current and high voltage load-line conditions, i.e., a power transistor suitable for use in switching circuits, but also having an unusually high resistance to collector-emitter secondary breakdown.

It is a further object of the invention to provide an improved process for the fabrication of such a transistor, including a novel combination of alloy steps and a post-alloy-diffusion operation.

An important feature of the invention is the provision of a relatively thick base width, ranging from 2.5 to 4 mils. A thick base region permits increased reliability during high current, high voltage operating conditions.

An additional feature of the invention is the deep diffusion gradient provided in the base region in front of the emitter junction. A resistivity gradient at this location will raise the punch-through voltage and produce an electric field which aids the flow of carriers from the emitter to the collector, thereby improving the frequency response and the switching characteristics of the device.

An additional feature of the invention is the relatively thick layer of uniform, low resistivity semiconductor formed between the emitter and the base contact.

In its process embodiments, the invention includes the feature of forming the alloyed collector region prior to the formation of the base region. This sequence avoids the need for etching and/or lapping techniques to remove a diffused layer in preparing the semiconductor surface for the step of forming an alloyed collector region.

A primary feature of the method is the use of a recrystallized, low-resistivity semiconductor alloy layer as a diffusion source, formed by alloying a lead-antimony preform to the emitter-base surface of the semiconductor die, which layer ultimately serves as an excellent connection between the active portion of the base region and the base contact. An additional feature of the diffusion step is the use of very pure molten lead, doped with antimony, as the diffusion source, since the lead acts as a "sink" or gettering agent for contaminants and lifetime killers such as nickel and copper. Accordingly, the essential requirement of maintaining high carrier lifetimes during the diffusion process is met.

An additional feature of the preferred embodiments of the invention is the simultaneous removal of alloy preforms from both the alloyed collector region and from the alloy regrowth region of the base, which has served as a diffusion source in forming the desired resistivity gradient in the base region. Subsequently, in the preferred embodiments the base contact, the collector contact, and the emitter electrode are simultaneously fused to the semiconductor body in a single operation to complete the structure.

The invention is embodied in a transistor structure including a semiconductor body of one conductivity type having a first alloy regrowth layer of the opposite conductivity type forming a collector region at one surface thereof, and a second alloy regrowth layer of the same conductivity type as the body at an opposite surface thereof. The structure further includes an alloyed emitter electrode at said opposite surface of the semiconductor body, including a regrowth portion of said opposite conductivity type extending through said second alloy regrowth layer, thereby forming an emitter region in the semiconductor body. The base region of the semiconductor body, lying intermediate the emitter and collector regions, includes a gradient of decreasing resistivity in the direction of the emitter-base junction. The structure further includes a base contact to said second alloy regrowth layer, and a collector contact to the first regrowth layer.

In a preferred embodiment of the above structure, the base region of the semiconductor body is N-type germanium having a resistivity of 20 to 35 ohm-centimeters in the vicinity of the collector junction and 0.005 to 0.5, preferably 0.05, ohm-centimeters in the vicinity of the emitter junction. In a particular germanium embodiment, the preferred conductivity-type determining impurity used in forming the first alloy regrowth layer is gallium. The second alloy regrowth layer of the above structure contains antimony as the primary conductivity-type determining impurity. The preferred emitter electrode is predominantly indium containing a substantial proportion of aluminum.

The invention is also embodied in a method of making a transistor structure, including the step of alloying impurity-bearing metal with a semiconductor body at one surface thereof to form a first alloy regrowth layer of a conductivity type opposite that of the remaining portion of the semiconductor body, to form a collector region. Next, the method includes the step of alloying impurity-bearing metal at an opposite surface of the semiconductor body to form a second alloy regrowth layer of a conductivity type opposite that of the first alloy regrowth layer. The second alloy regrowth layer serves as an impurity source in a diffusion step to form a graded impurity profile in the base region in front of the emitter junction, and also as a relatively thick layer of uniform, low resistivity semiconductor between the base contact and the emitter electrode for the purpose of optimizing switching times.

Thereafter, the impurity bearing metal preform is removed from the second regrowth layer, followed by the step of alloying an emitter electrode with the semiconductor body to form a third alloy regrowth layer extending through the second alloy regrowth layer to a greater depth within the semiconductor body than the second alloy regrowth layer. The structure is then completed by the step of fusing a base contact to the second alloy regrowth layer.

In a particular embodiment of the method, the semiconductor body is N-type germanium, the first alloy step involves the introduction of gallium as the predominant conductivity-type determining impurity, the second alloy step involves the introduction of antimony as the predominant conductivity-type determining impurity, and the third alloy step involves the introduction of indium and aluminum as the primary conductivity-type determining impurities.

In a further embodiment, the alloy preform used in forming the first regrowth layer consists essentially of lead containing 0.1% to 0.3% by weight gallium. The alloy preform used in forming the second regrowth layer consists essentially of lead containing 0.7% to 1.1% by weight antimony; and the emitter electrode consists essentially of indium containing 1.0% to 1.8%, preferably about 1.5%, by weight aluminum.

In a preferred embodiment, the method includes the initial step of alloying a lead-gallium preform with a first surface of a semiconductor body at a peak temperature of about 835 to 850° C., for a time insufficient to cause significant post-alloy-diffusion. The second regrowth layer is then formed by alloying a lead-antimony preform with the opposite surface of the semiconductor body, at a peak temperature of about 820 to 835° C., for a time sufficient to cause substantial post-alloy-diffusion of the antimony. The third regrowth layer is then formed by alloying an indium-aluminum emitter electrode penetrating said second regrowth layer, at a peak temperature of 510 to 525° C., for a time insufficient to cause significant post-alloy-diffusion.

In a further embodiment, removal of the lead preform from the second regrowth layer is carried out by the step of immersing the alloyed semiconductor body in an aqueous solution of hydrogen peroxide and acetic acid. Preferably, the method includes the step of removing the impurity-bearing metal preform from the first regrowth layer and subsequently forming a collector contact to the first alloy regrowth layer. It is particularly advantageous to remove both preforms simultaneously in a single peroxide-acid treatment.

In a particular embodiment of the method, the structure is completed by the simultaneous steps of (1) alloying an emitter electrode with the semiconductor body, (2) forming a collector contact to the first regrowth layer, and (3) forming a base contact to the second regrowth layer. All three steps are carried out in a single heating operation.

DRAWINGS

Figures 1, 2:
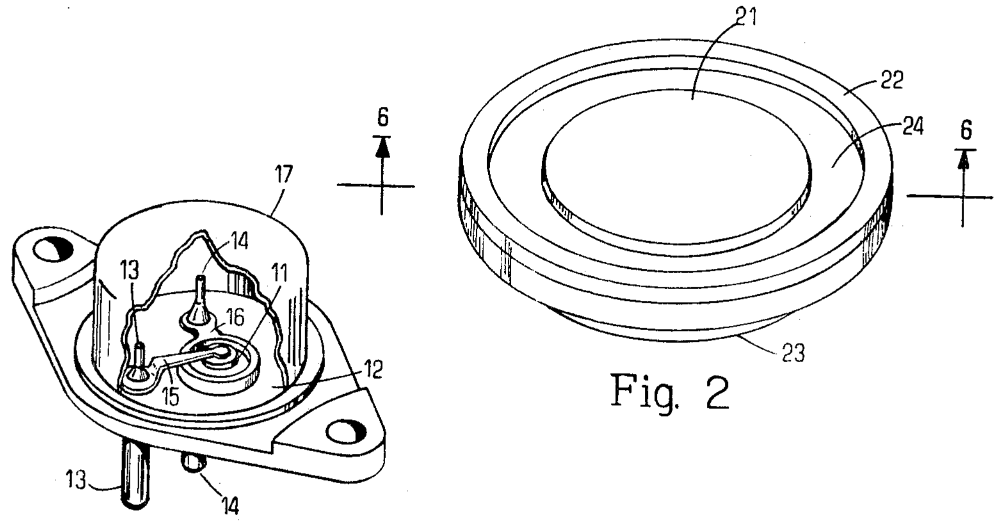
FIG. 1 is an isometric cutaway view of an assembled device, including the semiconductor structure of the invention.
FIG. 2 is an isometric view of the semiconductor structure, illustrating the emitter electrode and base ring contact.

In FIG. 1 the device is seen to consist of the active element 11, a mounting base 12, emitter feedthrough terminal 13, base terminal 14, and connections 15 and 16 from the feedthroughs to the active element, sealed after assembly by cold welding copper cap 17 on copper mounting base 12. Metal stampings 15 and 16 provide electrical connection means with the emitter and base electrodes, respectively, of the active element.

In FIG. 2 the completed semiconductor structure is seen to include emitter electrode 21, base electrode 22, and collector electrode 23. Surface region 24 of the semiconductor body consists of the N+ alloyed layer used as a diffusion source in the formation of a suitable resistivity gradient in the base region of the semiconductor body. This regrowth layer forms a low resistivity current path between the emitter and the base contact, to improve switching speed, and lower $V_{BE}$ voltages.

Figure 3:
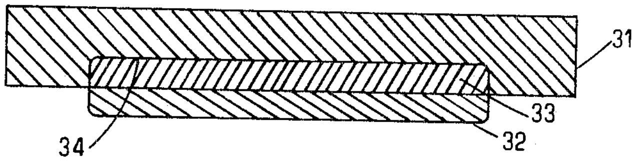
FIGS. 3 through 6 are greatly enlarged cross-sectional views of the semiconductor structure, illustrating successive stages of its fabrication.

FIG. 3 illustrates the first step in the fabrication of the semiconductor structure. Semiconductor 31 is preferably a 20 to 35 ohm-centimeter N-type etched germanium die. However, other resistivities and other semiconductor materials may be employed. Typically, the die will have a diameter of 0.258±.004 inch, and a thickness of 8 mils±.25 mil.

A preferred alloy preform 32 consists of a very pure lead doped with 0.25%±0.05% gallium. The preferred preform thickness is 8.7 mils±0.1 mil, although a substantial range of thicknesses is useful. A typical preform diameter is about 0.2 inch. A peak temperature of about 845° C. is preferred in forming regrowth layer 33, and collector junction 34. In this operation, the alloying temperature is somewhat higher than the temperature of subsequent alloying and diffusion steps used to form the base region of the transistor. Alloying at this higher temperature places regrowth region 33 deep enough to prevent the diffusion of antimony into the area of the collector junction. If the collector region were formed after the base diffusion process, the collector side of the die would have formed a diffused N-type layer that would have to be removed prior to the collector alloy step. Such removal is a costly, inefficient process which decreases control of fabrication by adding another tolerance requirement to die thickness. With the preferred sequence, there is some N-type layer formation on the germanium surface surrounding the collector electrode, but this is easily removed by conventional electrolytic etch, after assembly.

Figure 4:
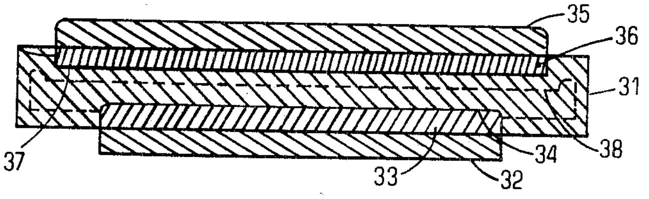

In FIG. 4 the alloy-diffusion step is illustrated in which the desired resistivity gradient is formed in the base region near the emitter junction. Alloy preform 35 is very pure lead, containing about 0.9%±0.1% antimony and having a thickness of 9.8 mils±0.1 mil. A peak temperature of 830° C. is preferably reached in the formation of alloy regrowth region 36, which extends to a depth 37 of about 1.6 mils. The temperature is then allowed to fall slightly, preferably to about 825° C., where it is maintained for about four hours in order to cause a post-alloy-diffusion of antimony extending to a depth 38 of about 3.5 mils.

Figure 5:
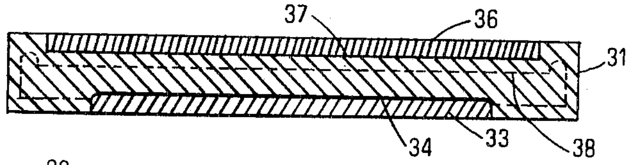

In FIG. 5 the semiconductor structure is illustrated after the removal of preforms 32 and 35. The removal is accomplished, for example, by immersing the structure in an aqueous solution of hydrogen peroxide and acetic acid, preferably in a 1:1 ratio by volume. This solution attacks both preforms vigorously while leaving the semiconductor body substantially unchanged.

It is within the scope of the invention to selectively remove preform 35 while leaving preform 32 in place to serve as the collector electrode. This is accomplished by coating preform 32 with apiezon wax, for example, before immersing the dice in the peroxide-acid etch. Subsequently, the dice are removed from the etch solution and the wax dissolved with hot trichloroethylene, for example. The dice are then given a light chemical etch in a 4:1:5 solution of $HNO_3$, HF, and $CH_3COOH$, respectively, for about 30 seconds, which is sufficient to clean the semiconductor surfaces.

Figure 6:
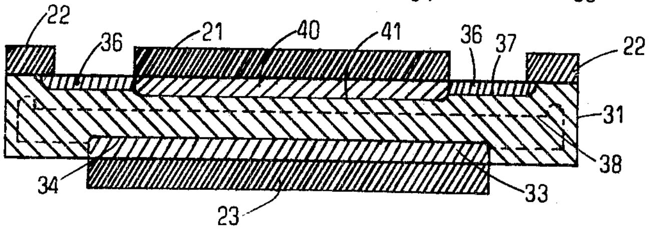

In FIG. 6 the final stage of device fabrication is illustrated. Emitter electrode 21 is suitably formed by the simultaneous alloying of a pure indium disk (0.17" x 12 miles) and a pure alumium washer (0.16 O.D. x 0.088" I.D. x 1 mil thick) at a peak temperature of about 520° C. The aluminum washer is placed directly on top of the indium disk, which, in turn, is contiguous with the recrystallized base surface of the germanium die. As a result, recrystallized emitter region 40 is formed, and emitter junction 41, located slightly below level 37 of regrowth layer 36.

In the same operation, or in separate steps, base ring 22 and collector electrode 23 are fused to the structure. The base ring is preferably an alloy of lead and tin containing a small amount of antimony measuring, for example, 0.26" O.D. x 0.209" I.D., and about 10.5 mils thick. The base ring must contact regrowth layer 36. The collector contact 23 is preferably composed of essentially pure indium containing about 0.2% by weight gallium.

As mentioned above, it is within the scope of the invention to retain lead preform 32 as a collector electrode. Difficulties have arisen with this embodiment, however, in an attempt to form a reliable solder bond between the collector junction of the germanium die and the pedestal or header of the TO–3 mounting base. Specifically, the lead is easily oxidized and even short storage periods result in a surface film of lead oxide which interferes with uniform, adequate solder flow, and adhesion to the mounting base. Thus it is common to observe many voids between the germanium die and the pedestal when lead is retained as a collector contact. These voids are apparently caused by a decomposition of lead oxide, releasing a gas during the high temperature soldering operation. Such voids significantly reduce the area available to transfer heat from the collector junction, resulting in unacceptably high $O_{JC}$ thermal impedance values.

The use of indium metal instead of lead allows a much lower soldering temperature to be used. The use of indium thereby eliminates any need to use special heat-resistant alloys in forming a hermetic cold-weld bond between the can and the mounting base.

The approximate depth of the alloyed N+ layer is 1.6 mils, and the diffusion reaches a depth of an additional 1.9 mils. The indium-aluminum emitter is then alloyed into the germanium base to a depth which just penetrates the N+ layer, leaving most of the diffusion gradient undisturbed in front of the emitter junction. Since aluminum doping is required in this device, and since it increases the penetration of the indium into the germanium by about 17% due to the high solubility of germanium in aluminum, and because the wetting of indium to germanium becomes worse as the alloy temperature decreases, the aluminum emitter should penetrate in excess of 1.0 mil. Since about 2.0 mils of diffusion gradient are required in front of the emitter, the total penetration depth of the alloy-diffused base region must be greater than 3 mils. The alloyed N+ layer acts as a low resistivity connection between the diffused portion of the active base and the base ring contact, and its sheet resistance is lower than for a diffused layer of the same depth. This is reflected in a lower $V_{BE}$ voltage and $R'_{BE}$ values.

Typical characteristics of the devices manufactured in accordance with the invention are as follows:

Collector-emitter breakdown voltage, $BV_{CEO}$, $I_B=0$, $I_{CEO}=100$ ma.—150 v.

Collector-emitter leakage current, $I_{CEX}$, $V_{BE}=0.2$ v., $V_{CE}=-170$ v.—0.5 ma.

Common emitter DC current gain, $h_{FE}$, $I_C=10$ a., $V_{CE}=-2$ v.—65

Collector-emitter saturation voltage $V_{CE(SAT)}$, $I_C=25$ a., $I_B=2.5$ a.—0.25 v.

Emitter-base saturation voltage, $V_{BE(SAT)}$, $I_C=25$ a., $I_B=2.5$ a.—0.65 v.

Collector-emitter sustaining voltage, $V_{CE(SUS)}$, $I_C=8$ a.—150 v.

Collector-emitter sustaining voltage, $V_{CE(SUS)}$, $I_C=25$ a.—80 v.

Current-gain bandwidth product, $f_T$, $I_C=5$ a., $V_{CE}=2$ v.—300 kHz.

I claim:

1. A method of making a transistor structure comprising the steps of:

(a) alloying impurity-bearing metal with a semiconductor body at one surface thereof to form a first alloy regrowth layer of a conductivity type opposite that of the remaining portion of the semiconductor body, (b) alloying impurity-bearing metal at an opposite surface of said semiconductor body to form a second alloy regrowth layer of a conductivity type opposite that of the first alloy regrowth layer, (c) heating the alloy semiconductor structure at a temperature and for a time sufficient to diffuse conductivity-type determining impurity from said second alloy regrowth layer a distance of at least 1.0 mil into the semiconductor body, (d) removing excess impurity bearing metal from said second regrowth layer, (e) alloying an emitter electrode with said semiconductor body at said opposite surface thereof to form a third alloy regrowth layer extending through said second alloy regrowth layer to a greater depth within said semiconductor body than said second alloy regrowth layer, and (f) forming a base contact to said second alloy regrowth layer.

2. A method as defined by claim 1 wherein said semiconductor is N-type germanium, said first alloy regrowth layer includes gallium as the predominant conductivity-type determining impurity, said second alloy regrowth layer includes antimony as the predominant conductivity-type determining impurity, and said third alloy regrowth layer includes indium and aluminum as primary conductivity-type determining impurities.

3. A method as defined by claim 1 wherein the alloy preform used in forming said first regrowth layer consists essentially of lead containing 0.1% to 0.3% by weight gallium, the alloy preform used in forming said second regrowth layer consists essentially of lead containing 0.7% to 1.1% by weight antimony, and the emitter electrode consists essentially of indium containing 1.0% to 1.8% by weight aluminum.

4. A method as defined by claim 3 wherein the alloy step in forming said first regrowth layer is carried out at a peak temperature of about 835 to 850° C. for a time which is insufficient to cause significant post-alloy diffusion; wherein the alloy step in forming said second regrowth layer is carried out at a peak temperature of 820 to 835° C., for a time sufficient to cause substantial post-alloy-diffusion; and wherein the alloy step in forming said third regrowth layer is carried out at a peak temperature of 510 to 525° C. for a time insufficient to cause significant post-alloy-diffusion.

5. A method as defined by claim 1 wherein said excess impurity-bearing metal is predominantly lead and its removal from said second regrowth layer is carried out by the step of immersing the alloyed semiconductor body in an aqueous solution of hydrogen peroxide and acetic acid.

6. A method as defined by claim 1 including the step of removing excess impurity-bearing metal from said first regrowth layer, and subsequently forming a collector contact to said first alloy regrowth layer.

7. A method as defined by claim 6 wherein the steps of (1) alloying an emitter electrode with said semiconductor body, (2) forming a collector contact to said first regrowth layer, and (3) forming a base contact to said second regrowth layer are carried out essentially simultaneously, in a single heating cycle.

References Cited

UNITED STATES PATENTS

| | | | |
|---|---|---|---|
| 2,943,006 | 6/1960 | Henkels | 148—178 |
| 3,074,826 | 1/1963 | Tummers | 148—181 |
| 3,245,846 | 4/1966 | Dehmelt et al. | 148—178 |

RICHARD O. DEAN, Primary Examiner

U.S. Cl. X.R.

148—181, 185